United States Patent [19]

Nolan et al.

[11] Patent Number: 4,739,234

[45] Date of Patent: Apr. 19, 1988

[54] DC MOTOR ADAPTIVE CONTROLLER APPARATUS

[75] Inventors: Dennis C. Nolan, West Allis; David A. Bluma, Milwaukee, both of Wis.

[73] Assignee: MagneTek, Inc., Los Angeles, Calif.

[21] Appl. No.: 30,877

[22] Filed: Mar. 26, 1987

Related U.S. Application Data

[63] Continuation-in-part of Ser. No. 900,451, Aug. 26, 1986, Pat. No. 4,716,348.

[51] Int. Cl.$^4$ .................... H02M 7/162; H02P 7/14
[52] U.S. Cl. .................................. 318/504; 318/339; 318/345 E; 318/345 G; 318/505; 363/84; 363/125
[58] Field of Search ........ 318/345 C, 345 CB, 345 D, 318/345 E, 345 G, 345 H, 599, 314, 339, 430, 431, 432, 504, 505, 596, 600, 799, 809; 323/212, 217; 363/78, 84, 85, 87, 88, 123, 125, 128, 135, 136

[56] References Cited

U.S. PATENT DOCUMENTS

| | | | |
|---|---|---|---|
| 4,054,820 | 10/1977 | Foster | 318/345 E X |
| 4,337,509 | 6/1982 | Omae et al. | 318/345 E X |
| 4,409,534 | 10/1983 | Bose | 318/345 E X |
| 4,571,668 | 2/1986 | Azusawa et al. | 318/345 C X |

FOREIGN PATENT DOCUMENTS

3412671  10/1984  Fed. Rep. of Germany ... 318/345 H

OTHER PUBLICATIONS

Roger Buckley, "Speed Controller System for a D.C. Motor", Electrotechnology, vol. 6, No. 4, p. 133; Oct. 1978.
Application Note AP-248, Dec., 1985, entitled "Using the 8096", by Ira Horden, Order No. 270061-001, published by Intel Corp.
GEK-45133B, Instructions Package Drive System Environment, General Electric Co.
GEK-85765C, DC-3000 Adjustable Speed Drives Installation Operation and Maintenance Instructions Custom Instruction Book No. 7VEYX017IB01, General Electric Co.
Instructions DC Adjustable Drive, GEK-85765C, Errata Sheet No. 01, Oct. 1985, "Instructions DC-300 Adjustable Speed Drives", General Electric Co.
Custom Software Description, IB #EYX017IB0101 and IB #PAX018IB0101, General Electric Co.

*Primary Examiner*—Bentsu Ro
*Attorney, Agent, or Firm*—John M. Haurykiewicz

[57] ABSTRACT

A method and apparatus for operating a DC motor controller according to a first gain when the armature current of the DC motor is discontinuous, according to a second gain when the armature current is continuous, and according to a third gain when the armature current is in transition from the discontinuous to continuous conduction. The gains have proportional and integral terms and the integral term in the discontinuous and transition regions varies inversely to a current reference in the controller.

8 Claims, 6 Drawing Sheets

4,739,234

DC MOTOR ADAPTIVE CONTROLLER APPARATUS

CROSS REFERENCE TO RELATED APPLICATION

This is a continuation-in-part of the co-pending patent application for a DC Motor Adaptive Controller, Ser. No. 900,451, filed Aug. 26, 1986, now U.S. Pat. No. 4,716,348.

BACKGROUND OF THE INVENTION

The field of this invention is phase-controlled DC motor regulators, particularly of the digital type, which use a power semiconductor section to provide variable amplitude armature current.

According to one embodiment, this invention relates to operation of DC motor controllers including those which utilize a microprocessor or other digital controller. An example of a microprocessor suitable for such application is an INTEL 8096 or 8097 microprocessor such as may be used in the practice of the invention in application Ser. No. 888,780 filed July 22, 1986, for a Digital Phase Synchronizer. Since that application provides a digital signal suitable for phase synchronization which may be utilized by a digital controller to provide phase firing information, it is expressly incorporated by reference herein. An alternative embodiment utilizes dedicated analog and digital logic circuitry to practice this invention.

In phase controlled DC motor regulator systems, it has been observed that there are two effective levels of gain in the power semiconductor output section corresponding, respectively, to the discontinuous and continuous current conduction regions. "Discontinuous current" refers to the condition where armature current starts from zero each time a power semiconductor is "fired" or turned on by the motor regulator. "Continuous current" refers to the condition or region of operation where armature current continues without interruption as successive phases are fired in the power semiconductor section. In the power semiconductor section, a relatively low gain region exists in the discontinuous region and a relatively high gain region exists in the continuous current region. Because of this, it has not heretofore been possible to optimize regulator gain over both the discontinuous and continuous conduction regions while at the same time adjusting the transition point between such regions. In addition, a significant non-linearity within the discontinuous current conduction region has been an obstacle to obtaining optimum regulator performance.

BRIEF SUMMARY OF THE INVENTION

The present invention overcomes these aspects of prior art regulator systems by providing for different gains or transfer functions or characteristics in the discontinuous and continuous armature current conduction regions of operation while providing for an automatic adjustment of the transition point between such regions; in addition, the present invention provides for a still different gain characteristic for the transistion point or region of moving from discontinuous to continuous armature current conduction. Furthermore, this invention provides for automatic compensation in the current regulator transfer function by providing a term inversely related to the current reference to optimize performance in the face of the non-linearity present in the discontinuous current region of the power semiconductor gain characteristic.

DETAILED DESCRIPTION

Figure 1:
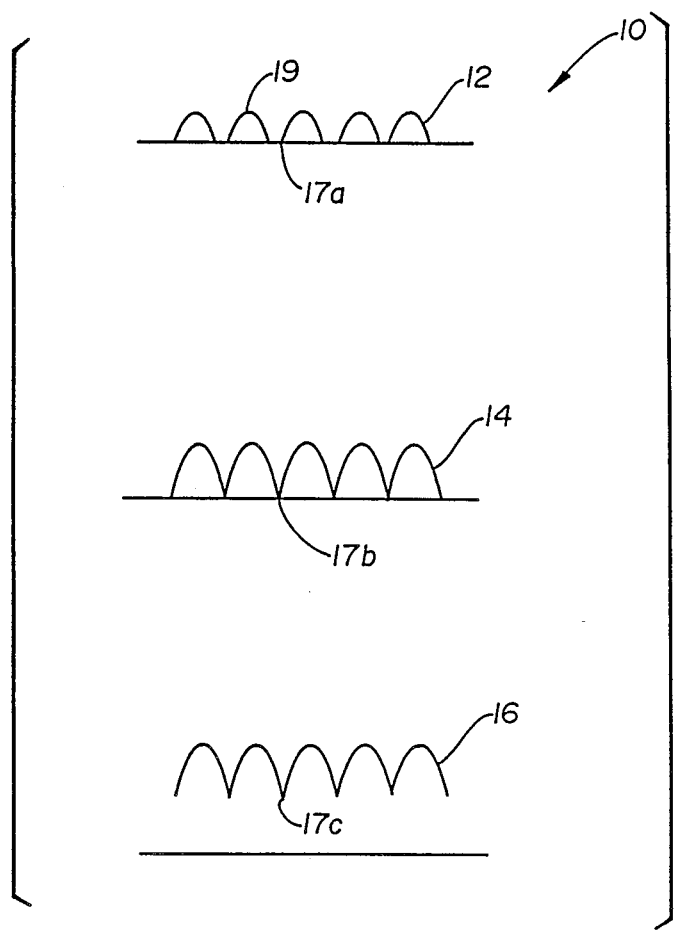
FIG. 1 shows armature current waveforms corresponding to the discontinuous, transition and continuous conduction regions of operation.

Referring to FIG. 1, representative waveforms of armature current 10 may be seen. Waveform 12 illustrates discontinuous current, waveform 14 illustrates armature current at the transition between discontinuous and continuous current, and waveform 16 illustrates armature current in continuous conduction from phase to phase.

The firing angle or point at which power semiconductors are turned on (normally by way of a gate control signal) is indicated at points 17a, b, c, respectively, for discontinuous, transition and continuous current.

Although of interest and usefulness in hybrid control systems having switched analog control transfer functions, this invention is particularly useful in the environment of digital control systems where it is possible to "anticipate" such firing angle conveniently. It has been found desirable to check for the presence or absence of armature current in advance of the firing angle for each phase about to be fired. Armature current will be zero at some point prior to the firing angle for discontinuous conduction but will be non-zero for continuous conduction. Instead of testing for zero, it has been found preferable to use a test or threshold level of 5% of rated motor current (in order to eliminate false signals due to noise) and furthermore it has been found preferable to check for armature current ten electrical degrees before the firing point. Such a ten degree advance has been found desirable to allow the digital processor sufficient time to perform the steps of this invention prior to the actual firing point in that phase. In the event that faster or slower digital controllers other than the INTEL 8097 microprocessor are used, it may be found advantageous to use fewer or greater electrical degrees in advance of the firing point in the practice of this invention.

Figure 2:
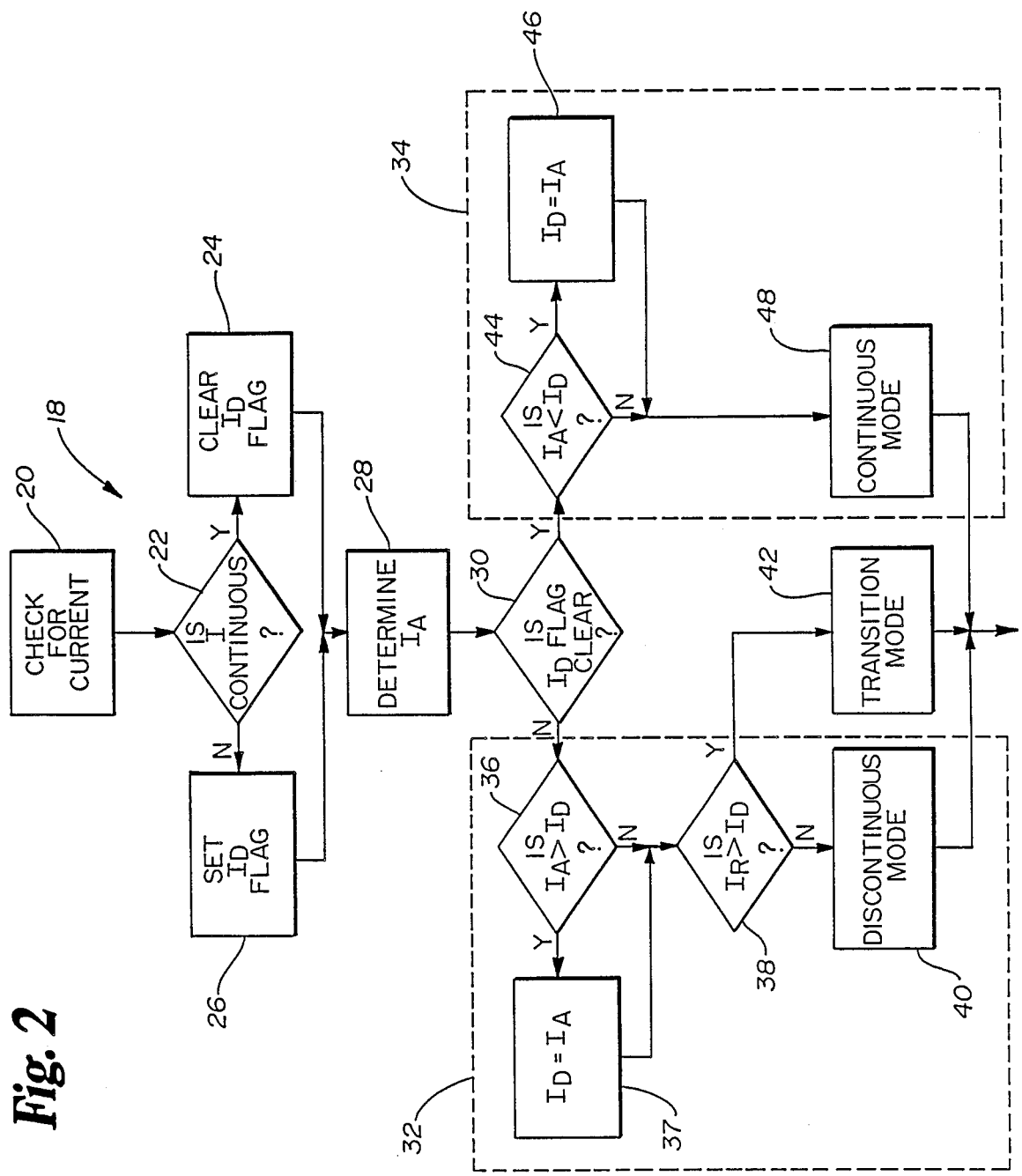
FIG. 2 is a block diagram of the present invention.

Referring now more particularly to FIG. 2, a block diagram 18 of the present invention may be seen.

In the practice of this invention, current is checked at block 22 in advance of the firing point of each phase or half cycle of the AC line to determine whether armature current is continuous or discontinuous. If the armature current is discontinuous, the $I_D$ (discontinuous current) flag is set at block 26. If armature current is continuous, the $I_D$ flag is cleared at block 24.

The digital regulator also measures or calculates an armature current signal $I_A$ representative of the average value of armature current at block 28. This calculation is performed by integrating waveform 19 of the armature current over its respective phase; it is not related to the current check at block 20. The average current signal, $I_A$, is preferably used by the digital processor as a feedback signal with a current reference, $I_R$, for current regulation purposes in a closed-loop current control.

The $I_D$ flag is sensed at block 30. If the $I_D$ flag is set, armature current is discontinuous, indicated by dashed block or subsystem 32. If the $I_D$ flag is clear, armature current is in continuous conduction, indicated by dashed block or subsystem 34.

Referring now more particularly to subsystem 32, average current, $I_A$, is compared at block 36 to $I_D$, the stored value of the highest discontinuous current previously sensed. If the average current is greater, the average value is retained, replacing the previously stored value at block 37. It is to be understood that it is the average value of the waveform 19 from the previous phase that is used in the comparison of block 36 which takes place immediately before firing point 17a of the present phase.

As the steps of system 18 are performed for each phase fired in the power semiconductor section, the system 18 will learn (through repetitive sequencing through blocks 36 and 38) the highest value obtainable by the drive for discontinuous armature current. In the event that the average current is less than the stored value of the highest discontinuous current previously sensed, the stored value will not be replaced with the average current but will be retained for the next comparison.

The highest sensed discontinuous current will be compared to the current reference, $I_R$, at block 38. Under steady state conditions, the highest value for discontinuous current stored will be greater than the current reference presently called for by the current regulator, and the drive will operate in the discontinuous mode as indicated at block 40. In the event that the current reference is greater than the highest value stored for discontinuous current, the drive will determine that it is in a transient state of increasing current leading to continuous conduction and will operate in the transition mode indicated at block 42 in anticipation of entering continuous current.

It has been found preferable to initialize $I_D$ to a value close to the expected highest discontinuous current to minimize the time in the transient mode while the drive "learns" the transition point for the first time.

When continuous armature current is sensed at block 22, the $I_D$ flag is cleared and average current, $I_A$, is compared to the highest previously stored discontinuous current, $I_D$, at block 44. If $I_A$ is less than $I_D$, the previously stored value $I_D$ is replaced with the present average value $I_A$ at block 46. This permits the drive system 18 to learn and retain a new highest discontinuous current level in the event that such level decreases, as will occur with higher CEMF values reached in motor operation. The drive will now operate in the continuous current conduction mode as indicated by block 48.

Because of the differing gains in the power semiconductor section in the continuous and discontinuous current transfer regions, it has been found desirable to operate the regulator according to different gain levels or transfer function characteristics in the regions or modes 40 and 48 for discontinuous and continuous current conduction. Furthermore, to provide for optimum operation in the transition mode 42 from discontinuous to continuous current conduction, a still different gain level is utilized. As is known, it is desirable to utilize combined proportional and integral type transfer functions for the current control loop regulator environment of the present invention. With the present invention, each of the proportional and integral terms of the overall regulator gain of the current control loop may be independently selected in each current region or mode to optimize system performance. Table 1 shows values which have been found to be desirable in a particular application, and are given by way of example to indicate the relative changes between the various modes.

TABLE 1

| MODE | GAIN | |
|---|---|---|
| | Proportional | Integral |
| Discontinuous | 5 | $3700/I_R$ |
| Transition | 5 | $2220/I_R$ |
| Continuous | 132 | 10 |

The most significant portion of the gain change is in the integral term. In the discontinuous and transition modes, the integral gain is an inverse function of the current reference $I_R$. In this particular application, the range of the integral gain in the discontinuous mode has been found to be desirably limited to 740 to 7.2. The integral gain term in the transition mode has been found to be desirably 0.6 times the value in the discontinuous mode. The proportional gain term in the continuous mode has been found desirably selected to correspond to the particular motor and load in a given application, with a typical range for this value between 25 and 1,000. The integral gain term is made a function of the current reference to compensate for non-linearity of the gain in the power semiconductor section. It is to be understood that the values in Table 1 correspond to proportional and integral coefficients in a transfer function for the current regulator overall gain and other values may be selected to optimize operation in a particular application. It is to be further understood that the transition mode 42 has been found to be desirable to avoid large overshoot in the current response when the system 18 is in the discontinuous armature current mode and the current reference is calling for a large increase in armature current.

By sensing and updating where the transition from discontinuous to continuous current takes place (and vice versa), it is possible to optimize the gain of the current regulator control loop independently in the discontinuous and continuous current operating regions. This enables the system to achieve overall higher performance without a corresponding sacrifice in control loop stability.

It may thus be seen that an improvement in a method of regulating DC motors of the type providing armature current through phase control of power semiconductors is disclosed where the improvement is made up of the steps of:

(a) repetitively sensing and storing the highest value of armature current while in discontinuous conduction as a transition value between discontinuous and continuous armature current conduction; and (b) regulating the armature current to a presently commanded value by operating at a first gain while the armature current is below the transition value, and at a second gain while the armature current is above the transition value.

It is to be further noted that the first gain of this improved method further has an integral gain transfer function having a coefficient varying inversely to the presently commanded value for armature current.

Breaking this down even more, the first step of this improved method includes the substeps of ($a_i$) checking for discontinuous conduction of armature current prior to the firing point of the power semiconductors, ($a_{ii}$) comparing the presently sensed value of armature current to the previously stored highest value of discontinuous armature current, and ($a_{iii}$) in the event of discontinuous conduction of armature current as determined in substep ($a_i$), storing the higher of the presently sensed and previously stored values of armature current as representative of the transition level.

The improvement also includes the steps of (c) comparing the value in storage after substep ($a_{iii}$) with the presently commanded value for armature current; and (d) regulating the armature current at a third gain (which has an integral gain characteristic) when the presently commanded value for armature current is greater than the value in storage after substep ($a_{iii}$), and (e) repetitively sensing and storing the lowest value of armature current while in continuous conduction as the transition value.

Substep (e) further includes the substeps of ($e_i$) comparing the presently sensed value of armature current to the previously stored highest value of discontinuous armature current, and ($e_{ii}$) in the event of continuous conduction of armature current as determined in substep ($a_i$), storing the lower of the presently sensed and previously stored values of armature current as representative of the transition level.

Figure 3:
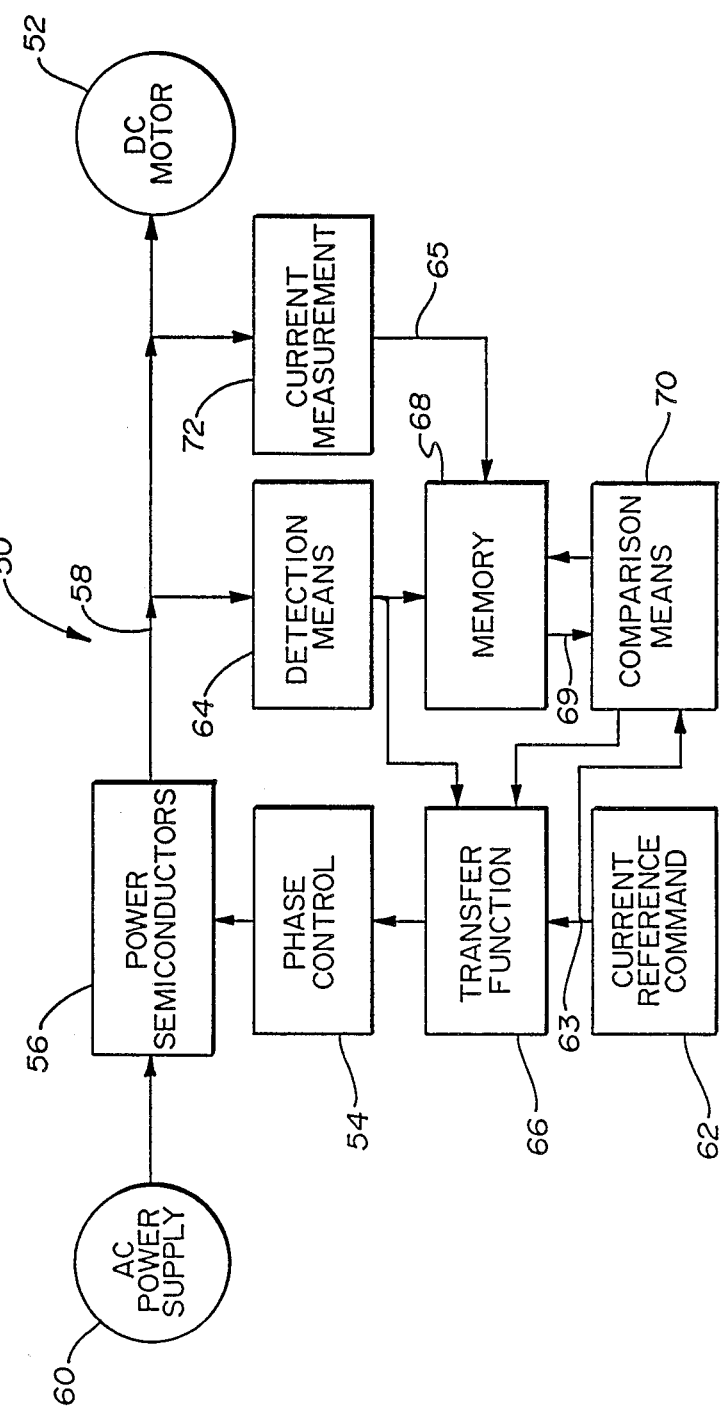
FIG. 3 is another block diagram showing further features of the present invention.

Referring now to FIG. 3, a regulator 50 for a DC motor 52 may be seen. Regulator 50 has a phase control 54 for power semiconductors 56 to provide armature current 58 from an AC power supply 60 in response to a current reference command 62. Regulator 50 also has a detection means 64 for detecting whether armature current 58 is continuous or discontinuous, and a transfer function means 66 for regulating armature current 58 according to a first transfer function characteristic having at least an integral gain term varying inversely to the current reference command 62 while the armature current 58 is discontinuous.

The transfer function means 66 further regulates armature current 58 according to a second transfer function characteristic while the armature current 58 is continuous.

Regulator 50 also has a current measuring means 72 for providing an armature current signal 65. Regulator 50 further has a memory 68 for retaining the highest armature current signal measured while armature current 58 is discontinuous, and a comparison means 70 for determining whether the current reference command 62 is greater than the retained armature current signal 69. The transfer function means 66 further regulates the armature current 58 according to a third transfer function characteristic while the armature current 58 is discontinuous and the comparison means 70 determines that the current reference command 62 is greater than the retained armature current signal 69. The memory means 68 further retains the lowest armature current signal measured while the armature current 58 is continuous.

More particularly, regulator 50 operates DC motor 52 through phase-control 54 by determining whether motor armature current 58 is continuous from phase to phase by sampling the armature current 58 a predetermined number of degrees ahead of the firing command in each phase; computing an average value of armature current; comparing the average value of armature current to a stored value representative of the highest previously sensed discontinuous armature current; retaining as the "retained value" the higher of the average value of armature current and the stored value of the highest previously sensed discontinuous armature current when armature current is discontinuous and retaining the lower of the average value and the stored value of the highest previously sensed discontinuous armature current when the armature current is continuous.

The retained value is compared to a current reference signal 63 when the armature current 58 is discontinuous.

Regulator 50 operates at (i) a first gain characteristic when the armature current 58 is discontinuous and the current reference signal 63 is less than the retained value, (ii) a second gain characteristic when the armature current 58 is continuous, and (iii) a third gain characteristic when the armature current 58 is discontinuous and the current reference 63 is greater than the retained value.

It is to be understood that the first, second and third gain characteristics each comprise proportional and integral type gain terms. Preferably, and as is shown in Table 1, the integral term in the first gain characteristic (corresponding to the discontinuous mode) is an inverse function of the current reference signal 63; the integral term is reduced in the second gain characteristic (corresponding to the continuous mode) relative to the first gain characteristic, and the integral term in the third gain characteristic (corresponding to the transition mode) is intermediate the integral terms of the first and second gain characteristics. Finally it may be noted that the integral term in the third gain characteristic is also preferably an inverse function of the current reference signal 63.

Figure 4:
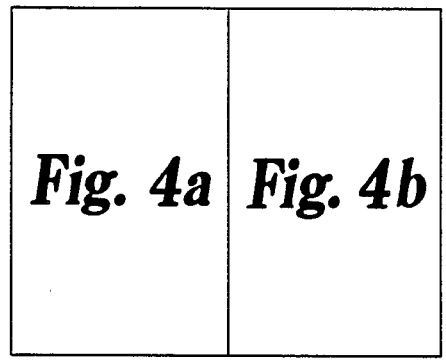
FIGS. 4a and 4b show a dedicated analog and digital logic circuit embodiment of this invention.

As an alternative to the microprocessor-based embodiment described above, FIGS. 4 and 5 disclose, respectively, a dedicated analog and digital logic circuitry embodiment 100 and corresponding waveforms 102 for this invention.

The dedicated analog and digital circuitry 100 has two main subparts or subsystems. The first subsystem "tracks" the discontinous to continuous transition level of armature current 101 of a motor 99. A determination as to whether the current 101 is continous or discontinuous is made just prior to each phase-controlled gating 98 (see FIG. 5) of an SCR bridge 105 which receives power from AC supply 107. An instantaneous current feedback IFB signal 104 from a current transducer 106 is constantly compared to a zero threshold ZTH signal 108 (a constant value which is just enough above zero to assure that, when the SCR bridge is not conducting, a current detector comparator 110 will sense that ZTH 108 is greater than IFB 104). A preferred value of ZTH would be one or two percent of rated bridge current. The comparator output signal ZC (zero current) 112 is a logic signal which is high when "no" current is flowing. A COPUL (combined pulses) logic signal 114 is a short pulse which occurs just before each SCR bridge gating. COPUL 114 is provided by a bridge gating logic circuit 116. When a COPUL pulse 114 occurs, the present state of ZC 112 is clocked through a D-type flip flop 118 and this state is held at the Q output of flip flop 118 until the next gating. A DIS (discontinuous current) logic signal 120 represents the discontinuous or continuous status of current 101. Signal 120 is high while bridge current 101 is discontinuous and low while bridge current 101 is continuous.

At startup, the binary output 124 of an eight-bit up-/down counter or memory 122 will be an arbitrary value. Binary output 124 is converted to a corresponding analog value 126 by a digital-to-analog converter (DAC) 128. It is to be understood that analog value 126 can take a range of values corresponding to the range of IFB signal 104 (which represents the range of operating bridge current 101). Output 126 of DAC 128 is an approximation of transition current, i.e. the value of current 101 at the point at which the current moves from discontinuous to continuous conduction (shown graphically in FIG. 1 by waveform 14). IFB 104 is passed through a relatively long-time-constant filter 130 (preferably on the order of 0.1 second) to reduce the ripple content and produce IAVE signal 132 approximating the average value of bridge current 101. IAVE 132 is constantly compared with ITRAN 126 by a comparator 134 whose output is the TRAN (transition) logic signal 136. TRAN 136 will be high if IAVE 132 is greater than ITRAN 126. Otherwise, TRAN 136 will be low.

TRAN 136 and DIS 120 are logically ANDED by gate 138 to produce the UG (up gate) logic signal 140. UG 140 will be high only if TRAN 136 is high and DIS 120 is high or, in other words, only if bridge current 101 is discontinuous and IAVE 132 is greater than ITRAN 126. It is to be understood that since ITRAN 126 is to represent the transition level, it will represent the HIGHEST LEVEL OF DISCONTINUOUS CURRENT, and also the LOWEST LEVEL OF CONTINUOUS CURRENT.

ITRAN 126 approaches or "learns" the transition level as follows: If UG 140 is high then ITRAN 126 is set equal to IAVE 132 since IAVE 132 then represents a level of discontinuous current which is higher than the present value of ITRAN 126. In order to achieve this "replacement", UG 140 is logically ANDED by gate 142 with a fixed high frequency, digital CLK (clock) signal 146 of a digital clock 144 to produce an UC (up clock) logic signal 148. The CLK signal 146 will be passed through gate 142 to UC 148 whenever UG 140 is high. UC 148 pulses will cause the binary output 124 of the eight-bit counter 122 to increase. This will cause ITRAN 126 to increase until it is substantially equal to IAVE 132. More particularly, counter 122 will count up until the binary value 124 is one binary count higher than a binary representation of IAVE 132, at which time TRAN 136 will switch low, forcing UG 140 low, which will force UC 148 low, holding the count 124 representing ITRAN 126 in counter 122, now acting as a memory.

TRAN signal 136 is logically inverted by inverter 150 to produce the NOTRAN (not transition) signal 152. NOTRAN 152 will be high only if IAVE 132 is less than ITRAN 126. DIS 120 is also logically inverted by inverter 154 to produce a CON (continuous current) signal 156. CON 156 will be high only if bridge current 101 is continuous. NOTRAN 152 and CON 156 are logically ANDED by gate 158 to produce the DG (down gate) logic signal 160. DG 160 will be high only if NOTRAN 152 is high and CON 156 is high, or, in other words, only if IAVE 132 is less than ITRAN 126 and bridge current 101 is continuous. If DG 160 is high, then ITRAN 126 should be set equal to IAVE 132 since IAVE 132 represents a level of continuous current which is lower than the present value of ITRAN 126. In order to achieve this "replacement", DG 160 is logically ANDED by gate 162 with the CLK signal 146 to produce DC (down clock) signal 164. DC 164 pulses will cause the binary output 124 of the eight-bit counter 122 to decrease. This will cause ITRAN 126 to decrease until it is substantially equal to IAVE 132. More particularly, counter 122 will count down until the binary value 124 is one binary count lower than IAVE 132, at which time TRAN 136 will switch high, NOTRAN 152 will switch low, DG 160 will switch low, and DC 164 will switch low, holding the count 124 at a digital value representing ITRAN 126 in counter 122 again acting as a memory by holding its contents until further updated.

The overall effect of the circuitry described above is that, at every level of current 101 at which the bridge 105 is actually operated, the circuit or subsystem described above will compare the present value of bridge current with the value "stored" as ITRAN 126. If the presently sensed value of bridge current is a better approximation to the true transition level than the stored value, then the stored value will be updated to the presently sensed value.

The second subsystem of circuitry 100 controls motor or bridge current 101 according to various gain characteristics depending upon the state or mode of the current 101 as determined by the first subsystem.

Figure 5:
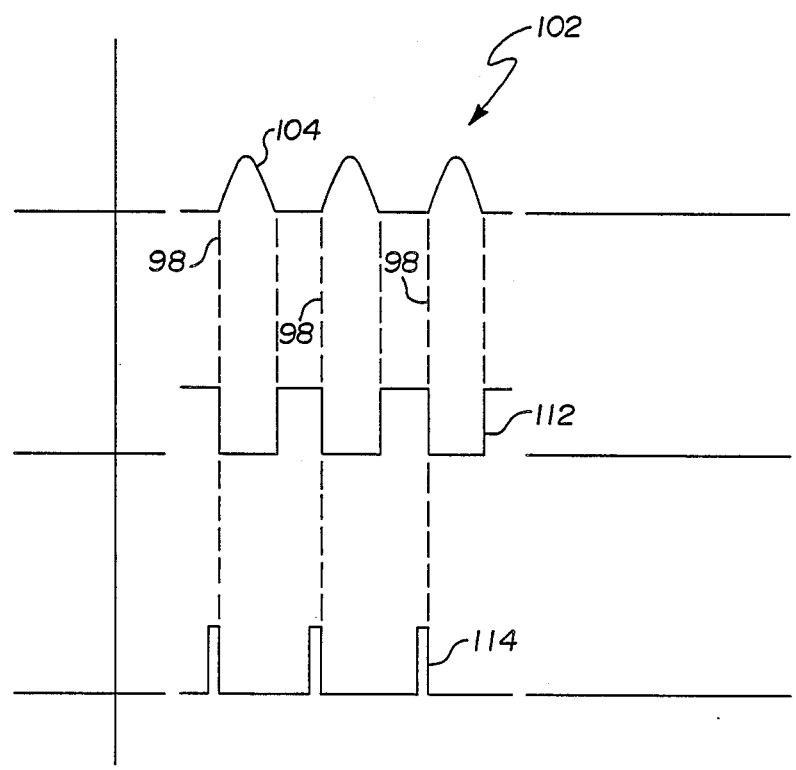
FIG. 5 shows waveforms corresponding to a discontinuous current mode and illustrating relative timing of certain logic signals.
Figure 4A:
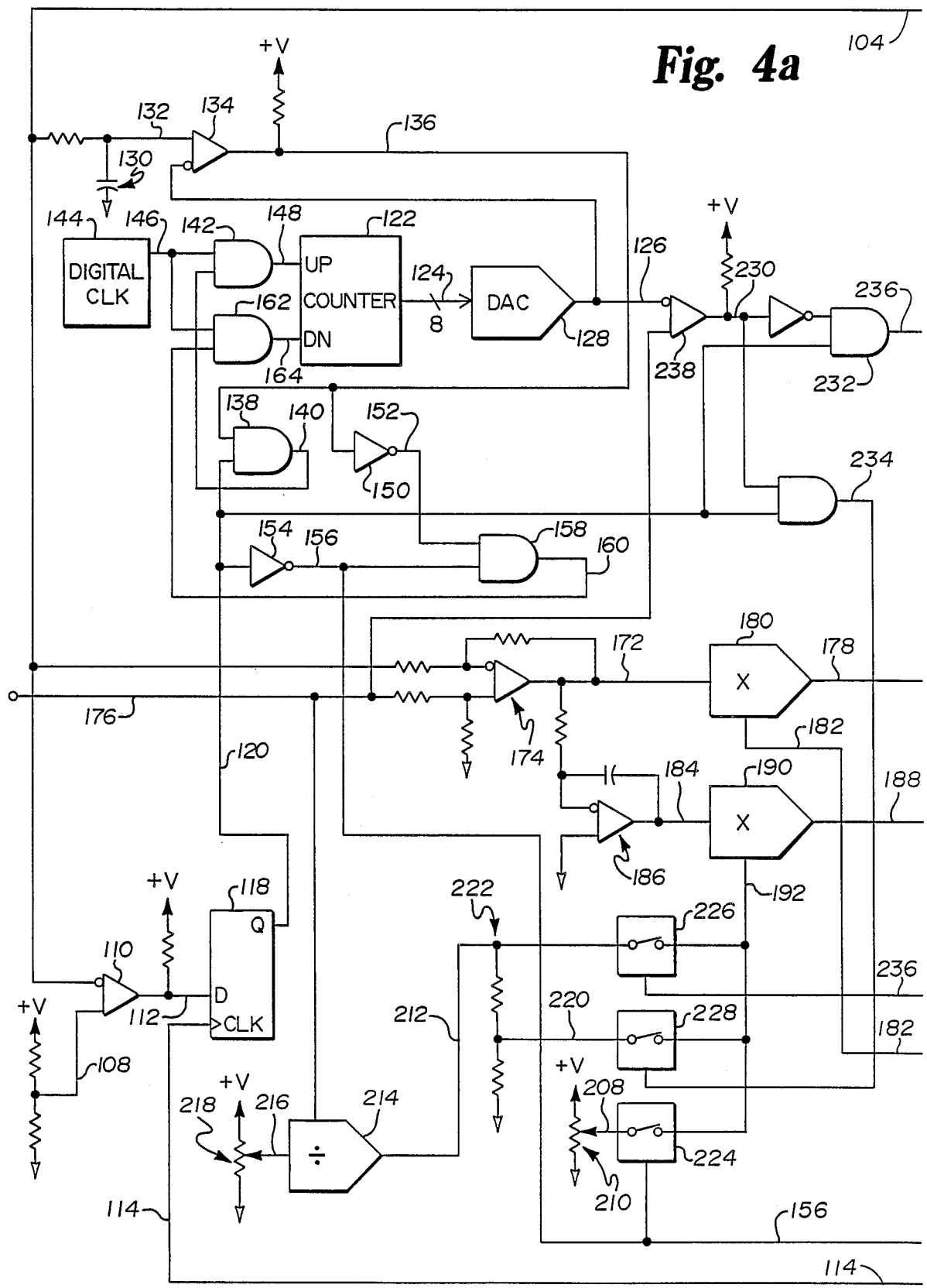
Figure 4B:
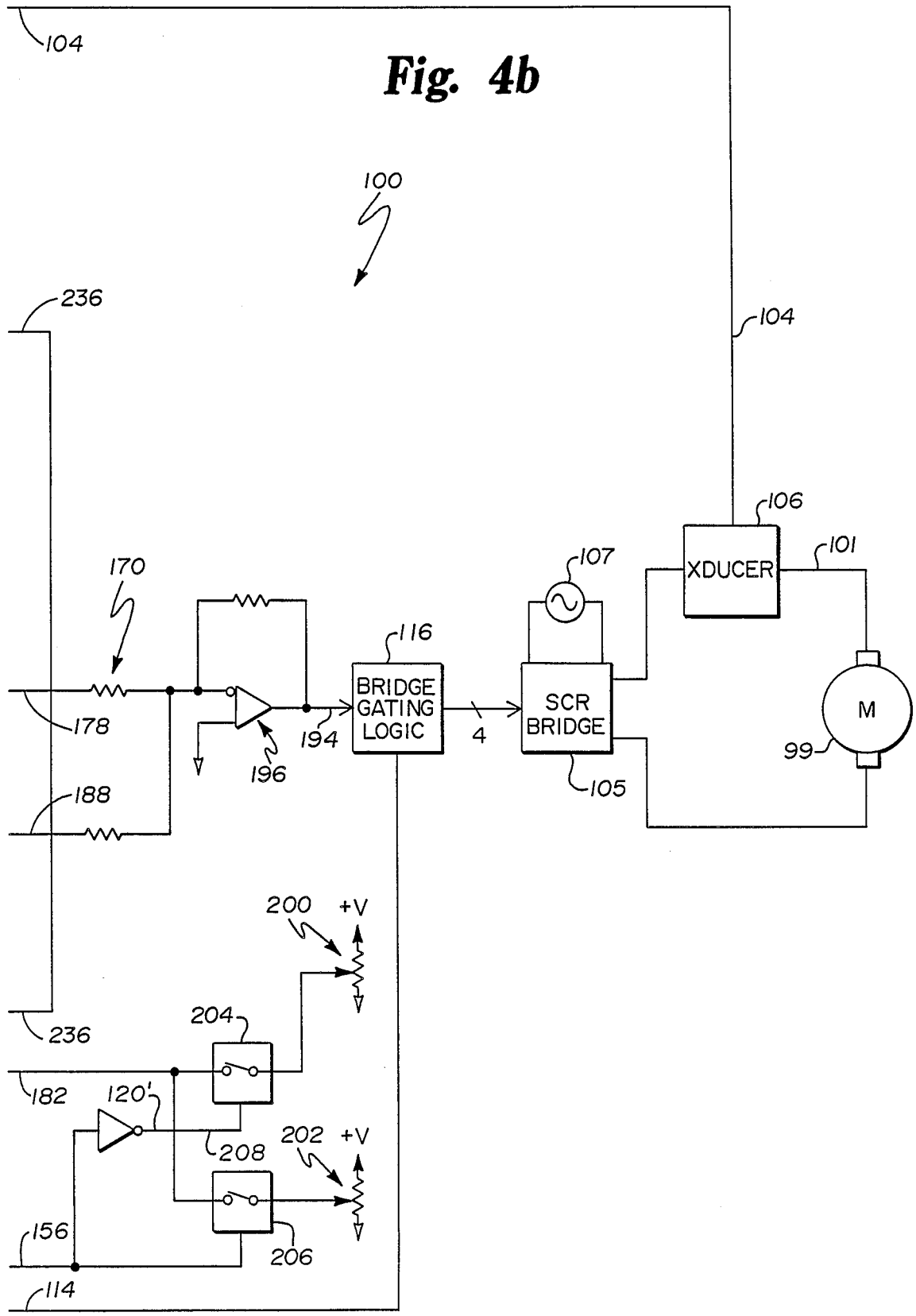

The second subsystem of circuitry 100 includes a current regulator 170. The regulator 170 is of the proportional plus integral type. An IER (current error) analog signal 172 is generated by a differential amplifier 174 receiving and substracting the IFB (current feedback) 104 from an IREF (current reference) analog signal 176. An analog PET (proportional error term) signal 178 is generated by an analog multiplier 180 by multiplying IER 172 times a PG (proportional gain) signal 182. An analog IERINT (current error integral) signal 184 is generated by a conventional op amp integrator circuit 186 as the time integral of IER 172. An analog IET (integral error term) signal 188 is generated by an analog multiplier 190 multiplying IERINT 184 times an IG (integral gain) signal 192. The analog FIRING ANGLE signal 194 is generated by a summing amplifier 196 as the inverted sum of PET 178 and IET 188. The FIRING ANGLE signal 194 is the command input to the bridge gating logic 116, which can be of conventional design. It is to be understood that the FIRING ANGLE signal 194 controls the phase delay used within the phase control bridge firing logic, and that logic 116 generates a COPUL pulse 114 immediately prior to the firing point in each phase as is shown in FIG. 5.

It is to be understood that the gains used in the proportional and integral signal paths of this regulator 170 are not constant (as the case in most prior art designs), but are selectable and are automatically selected by circuitry 100 to adapt regulator operation to the then-current bridge current condition or mode to optimize performance. A PG (proportional gain) level 182 is selected from one of two gains which are adjusted by potentiometers 200, 202 to match the electrical characteristics of the bridge load 99. The voltages set by the two potentiometers, DPGS (discontinuous proportional gain setting) 200 and CPGS (continuous proportional gain setting) 202 are each connected to one of two analog switches 204, 206. The output terminals of switches 204, 206 are connected together to provide PG 182. Each such switch has a logic control input 208. When the logic control input 208 is high, the switch is effectively closed and when the control 208 is low, the switch is effectively open. When current 101 is continuous, CON 156 is high and DIS 120 is low, closing CPGS switch 206 and opening DPGS switch 204, causing PG 182 to be equal to the value set by CPGS 202. In a similar manner, if current 101 is discontinuous, then PG 182 is equal to the value set by DPGS 200.

There are three possible values to be used as IG 192. A CIGS (continuous integral gain setting) 208 is set by a potentiometer 210 according to the bridge load requirements. CDIG (calculated discontinuous integral gain) 212 is generated by an analog divider 214 as DIGS (discontinuous integral gain setting) 216 divided by IREF 176. DIGS 216 is set by a potentiometer 218 according to bridge load requirements. The third possible value for IG 192 is TIG (transition integral gain) 220, which is a set proportion of CDIG (one preferred value is 60 percent) obtained from voltage divider 222. If current 101 is continuous, CON 156 is high, closing the CIGS switch 224. DIS 120 is low, causing both TGS (transition gain select) 234 and DGS (discontinuous gain select) 236 low, opening both the CDIG switch 226 and TIG switch 228. Thus, CIGS 208 will be selected whenever current 101 is continuous.

CONREF (continuous reference) logic signal 230 is generated by the comparison of ITRAN 126 and IREF 176 in comparator 238. CONREF 230 will be high only if IREF 176 is greater than ITRAN 126 or, in other words, when a "continous" level of current is being commanded. If current 101 is discontinuous, CON 156 is low, opening the CIGS switch 224. If IREF 176 is less than ITRAN 126, discontinuous current is being commanded, and CONREF 230 will be low, forcing TGS 234 low, opening the TIG switch 228. Both inputs to the DGS AND gate 232 will be high, so DGS 236 will be high, closing the CDIG switch 226.

Either of the two states described above can continue indefinitely. The third state or mode, however, will always be transient. If current 101 has been and is discontinuous, then DIS 120 will be high and CON 156 will be low. If IREF 176 has been less than ITRAN 126, then CDIG 212 will have been selected for the integral gain IG 192. If IREF 176 is now changed abruptly to a new value greater than the present value of ITRAN 126, then CONREF 230 is high, DGS 236 is forced low, and TGS 234 will be high. This action will select the transition gain, TIG 220, and this gain will remain selected as the integral gain IG 192 until either the current 101 becomes continuous (which may take several gatings), or IREF 176 is set back below ITRAN 126.

The second subsystem of circuitry 100 thus will operate according to one of three gains corresponding to the present status of bridge current 101, thus providing both a high level of response and good stability in both the discontinuous and continuous current modes, and further provides improved performance as the bridge current moves from discontinuous to continuous conduction.

The invention is not to be taken as limited to all of the details thereof as modifications and variations thereof may be made without departing from the spirit or scope of the invention; accordingly,

What is claimed is:

1. An improvement for a regulator of the type having phase control of electric current supplied to a load from silicon controlled rectifier power semiconductors arranged in a bridge comprising:
   (a) a first dedicated analog and digital logic circuit means for determining whether said current is in discontinuous or continuous conduction from phase to phase of said semiconductors; and
   (b) a second dedicated analog and digital logic circuit means for operating said regulator at:
      (i) a first gain when said current is discontinuous,
      (ii) a second gain when said current is continuous, and
      (iii) a third gain when said current has a transition value when going from discontinuous to continuous conduction.

2. The improvement of claim 1 wherein said first circuit means further comprises a free-running digital clock signal and a digital counter which counts up said digital clock signal to a value representative of said current when said current is discontinuous and said first circuit means determines said transition value is above the value previously stored in said counter.

3. The improvement of claim 2 wherein said counter counts down said digital clock signal to a value representative of said current when said current is continuous and said first circuit means determines said transition value is below the value previously stored in said counter.

4. The improvement of claim 1 wherein said first circuit means further comprises:
   (a) a current transducer providing an instantaneous current feedback signal representative of bridge current;
   (b) a current detector comparator receiving said instantaneous current feedback signal and providing a digital output having a first value representative of the presence of bridge current and a second value representative of the absence of bridge current;
   (c) a D-type flip-flop receiving the output of said current detector comparator and clocked at a time immediately prior to each gate pulse command for phase-firing said bridge and having an output indicative of the discontinuous or continuous status of said current.

5. In a closed-loop SCR phase-controlled current regulator of the type having analog current reference and current feedback signals for regulating phase-controlled current in discontinuous conduction at relatively low current levels and in continuous conduction at relatively high current levels, the improvement comprising a free-running digital clock signal and a digital up/down counter gated to count said digital clock signal such that said counter contains a value representative of the highest level of phase-controlled current in discontinuous conduction and a dedicated analog and digital logic circuit means for operating said regulator at: (i) a first gain when the value stored in said counter is greater than the present value of said current reference signal, and (ii) a second gain when the value stored in said counter is less than the present value of said current reference signal.

6. The improvement of claim 5 wherein said counter is further gated for decrementing to and thereafter storing a value representative of the lowest level of phase-controlled current in continuous conduction.

7. Apparatus for operating a regulator in a closed-loop current control mode by adjusting the firing angle of power semiconductors arranged in a bridge circuit between a source of alternating current input power and a DC motor armature comprising:

(a) a current transducer for providing a feedback signal representative of the instantaneous value of motor current;

(b) a low-pass filter for averaging said instantaneous current feedback signal to provide a signal representative of average motor current;

(c) a digital sample and hold circuit including a first comparator receiving said average motor current signal and a dual-gated up/down counter adapted to increment and decrement in response to a respective one of two gating signals and a digital-to-analog converter for providing an analog signal representative of the contents of said counter; and (d) a second comparator receiving said instantaneous motor current feedback signal and providing an output representative of the zero or non-zero condition of said instantaneous current feedback signal to a D-type flip-flop receiving a clock signal immediately prior to the firing signal in each phase of the bridge circuit wherein said counter is gated by an increment enable gate responsive to a high output of said first comparator to increment said counter when the average value of said motor current signal exceeds the value stored in said counter and said D-type flip-flop indicates that said bridge current is discontinuous.

8. The apparatus of claim 7 further comprising a decrement enable gate responsive to a low output of said first comparator to decrement said counter while said D-type flip-flop indicates said motor current is continuous and the value stored in said counter exceeds the average value of said motor current signal.

* * * * *